(12) United States Patent
Arao et al.

(10) Patent No.: US 12,013,571 B2
(45) Date of Patent: Jun. 18, 2024

(54) OPTICAL CONNECTION DEVICE

(71) Applicant: SUMITOMO ELECTRIC INDUSTRIES, LTD., Osaka (JP)

(72) Inventors: Yuki Arao, Osaka (JP); Tetsuya Hayashi, Osaka (JP); Tetsuya Nakanishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 236 days.

(21) Appl. No.: 17/756,197

(22) PCT Filed: Nov. 27, 2020

(86) PCT No.: PCT/JP2020/044329
§ 371 (c)(1),
(2) Date: May 19, 2022

(87) PCT Pub. No.: WO2021/112016
PCT Pub. Date: Jun. 10, 2021

(65) Prior Publication Data
US 2022/0413221 A1   Dec. 29, 2022

(30) Foreign Application Priority Data
Dec. 3, 2019  (JP) .................................. 2019-219055

(51) Int. Cl.
*G02B 6/26* (2006.01)
(52) U.S. Cl.
CPC .................................. *G02B 6/262* (2013.01)
(58) Field of Classification Search
CPC .................................................... G02B 6/262
(Continued)

(56) References Cited

U.S. PATENT DOCUMENTS

2014/0010508 A1* 1/2014 Matsuo ............. G02B 6/02042
385/127
2014/0369659 A1   12/2014 Uemura et al.
2016/0245992 A1*  8/2016 Takenaga .......... G02B 6/02019

FOREIGN PATENT DOCUMENTS

JP    2012-524302 A    10/2012
JP    2013-522677 A     6/2013
(Continued)

OTHER PUBLICATIONS

International Search Report issued in Patent Application No. PCT/JP2020/044329 dated Jan. 26, 2021.

*Primary Examiner* — Jerry M Blevins
(74) *Attorney, Agent, or Firm* — PEARNE & GORDON LLP

(57) ABSTRACT

The disclosure relates to an optical connection device reducing a connection loss between an SCF and an MCF. The optical connection device includes plural relay fibers and a capillary having third and fourth end faces. Each relay fiber includes a first core of $\Delta 1$, a second core of $\Delta 2$, and a cladding of $\Delta 3$. The capillary includes a tapered portion with an outer diameter ratio R of the fourth end face to the third end face of 0.2 or less. In each relay fiber, a value of Formula (V2−V1)/R falls within a range from 156% $\mu m^2$ to 177% $\mu m^2$, V1 (% $\mu m^2$) is given by $(\pi \cdot r1_b^2) \times (\Delta 1 - \Delta 2)$ by using a radius $r1_b$ ($\mu m$) of the first core, and V2 (% $\mu m^2$) is given by $(\pi \cdot r2_b^2) \times (\Delta 1 - \Delta 2)$ by using a radius $r2_b$ ($\mu m$) of the second core.

5 Claims, 12 Drawing Sheets

(58) Field of Classification Search
USPC .......................................................... 385/43
See application file for complete search history.

(56) References Cited

FOREIGN PATENT DOCUMENTS

| | | |
|---|---|---|
| JP | 2014-016472 A | 1/2014 |
| JP | 2015-001673 A | 1/2015 |
| JP | 2016-153863 A | 8/2016 |
| WO | 2010/120958 A1 | 10/2010 |
| WO | 2011/116109 A1 | 9/2011 |
| WO | 2018/227008 A1 | 12/2018 |

* cited by examiner

Fig.6

| | | SAMPLE 1 | SAMPLE 2 | SAMPLE 3 | SAMPLE 4 | SAMPLE 5 | SAMPLE 6 | SAMPLE 7 | SAMPLE 8 |
|---|---|---|---|---|---|---|---|---|---|
| MFD | SCF | 9.2 | 9.2 | 8.6 | | 9.2 | | 8.6 | |
| | MCF | | | | 9.2 | | 8.6 | | 8.6 |
| OUTER DIAMETER RATIO R | | 0.16 | 0.2 | 0.16 | 0.2 | 0.16 | 0.2 | 0.16 | 0.2 |
| Δ1-Δ2 @589nm | | 0.3-0.4% | 0.3-0.4% | 0.35-0.45% | 0.35-0.45% | 0.3-0.4% | 0.3-0.4% | 0.35-0.45% | 0.35-0.45% |
| r1a(μm) | | 4.0-4.5 | | | | | | | |
| r1b(μm) (r1a·R) | | 0.68 | 0.85 | 0.68 | 0.85 | 0.68 | 0.85 | 0.68 | 0.85 |

Fig. 8

| | SAMPLE 1 | SAMPLE 2 | SAMPLE 3 | SAMPLE 4 | SAMPLE 5 | SAMPLE 6 | SAMPLE 7 | SAMPLE 8 |
|---|---|---|---|---|---|---|---|---|
| Δ2-Δ3 @589nm | 0.35-0.45% | | | | 0.4-0.5% | | | |
| r2b (μm) | 4.75-5.25 | 5.25-5.75 | 4.75-5.25 | 5.25-5.75 | 4.5-5.0 | 5.0-5.5 | 4.5-5.0 | 5.0-5.5 |
| r2a (μm) (r2b/R) | 29.6-32.8 | 26.3-28.8 | 29.7-32.8 | 26.3-28.8 | 28.1-31.3 | 26-27.5 | 28.13-31.3 | 25-27.5 |
| V1 (%μm²) | 0.51 | 0.79 | 0.58 | 0.91 | 0.51 | 0.79 | 0.58 | 0.91 |
| V2 (%μm²) | 24.8-30.3 | 30.3-36.4 | 24.8-30.3 | 30.3-36.4 | 25.4-31.4 | 31.4-38.0 | 25.4-31.4 | 31.4-38.0 |
| (V2-V1)/R (%μm²) | 150 - 187 | 148 - 178 | 151 - 186 | 147 - 177 | 156 - 193 | 153 - 186 | 155 - 193 | 153 - 186 |
| r2a/r1a | ≧7.0 | ≧6.2 | ≧7.0 | ≧6.2 | ≧6.6 | ≧5.9 | ≧6.6 | ≧5.9 |

OPTICAL CONNECTION DEVICE

TECHNICAL FIELD

The present disclosure relates to an optical connection device.

This application claims the priority of Japanese Patent Application No. 2019-219055 filed on Dec. 3, 2019, which is relied upon and incorporated herein by reference in its entirety.

BACKGROUND ART

A fan-in/fan-out (FIFO) device is known as an example of an optical connection device that optically connects a plurality of cores included in a multi-core fiber (hereinafter, referred to as an "MCF") and a plurality of single-core fibers (hereinafter, referred to as "SCFs") in a one-to-one correspondence state. Usually, when the plurality of SCFs are bundled, it is difficult to directly connect the plurality of cores of the MCF and the plurality of SCFs due to a difference in core pitch. Thus, when the plurality of SCFs in one-to-one correspondence with the plurality of cores of the MCF are optically connected, pitch conversion is performed by using the FIFO device. It should be noted that Patent Document 1 and Patent Document 2 disclose a fusion and elongation type FIFO device as the above-described FIFO device.

CITATION LIST

Patent Literature

Patent Document 1: Japanese Patent Application Laid-Open No. 2014-16472
Patent Document 2: Japanese Patent Application Laid-Open No. 2015-1673

SUMMARY OF INVENTION

An optical connection device according to an embodiment of the present disclosure includes a FIFO device having a structure for enabling optical connection with an SCF for each of a plurality of cores included in an MCF. An MFD of each core of the MCF to be optically connected via the FIFO device falls within a range of 8.6 μm or more and 9.2 μm or less, and an MFD of the SCF also falls within a range of 8.6 μm or more and 9.2 μm or less. In order to solve the above problem, the FIFO device includes a plurality of relay fibers and a capillary. The plurality of relay fibers are provided in one-to-one correspondence with the plurality of cores of the MCF. Each relay fiber includes a first core, a second core provided so as to surround an outer periphery of the first core, and a cladding provided so as to surround an outer periphery of the second core, and has a first end face and a second end face opposite to the first end face. The first core has a relative refractive index difference $\Delta 1(\%)$, the second core has a relative refractive index difference $\Delta 2(\%)$ lower than the relative refractive index difference $\Delta 1$, and the cladding has a relative refractive index difference $\Delta 3(\%)$ lower than the relative refractive index difference $\Delta 2$. The capillary has a third end face (SCF-side end face) and a fourth end face (MCF-side end face) arranged to be opposite to each other, and integrally holds each of the plurality of relay fibers extending from the third end face toward the fourth end face. A distal end portion including the first end faces of the plurality of relay fibers protrudes from the third end face. The fourth end face is a face facing an end face of the MCF, and the second end faces of the plurality of relay fibers are arranged (the fourth end face and the other end faces of the plurality of relay fibers coincide with each other). The capillary includes a tapered portion provided between the third end face and the fourth end face. The tapered portion has an outer diameter ratio R of 0.2 or less defined by $OD_{MIN}/OD_{MAX}$ which is a ratio of an outer diameter $OD_{MIN}$ of the fourth end face to an outer diameter $OD_{MAX}$ of the third end face. Each of the plurality of relay fibers is configured such that a value defined by Formula $(V2-V1)/R$ falls within a range of 156% μm² or more and 177% μm² or less. Here, V1(% μm²) is a refractive index volume (profile volume) given by a product $((\pi \cdot r1_b^2) \times (\Delta 1 - \Delta 2))$ of a cross-sectional area of the fourth end face defined by a radius $r1_b$ (μm) of the first core and a difference $(\Delta 1 - \Delta 2)$ between the first and second relative refractive index differences, and V2(% μm²) is a refractive index volume given by a product $((\pi \cdot r2_b^2) \times (\Delta 2 - \Delta 3))$ of a cross-sectional area of the fourth end face defined by a radius $r2_b$ (μm) of the second core and a difference $(\Delta 2 - \Delta 3)$ between the second and third relative refractive index differences.

BRIEF DESCRIPTION OF DRAWINGS

FIG. 6 is a chart illustrating the MCF and an SCF constituting a measurement system of the connection loss between the MCF and the SCF, and each structure parameter of a FIFO sample for each of eight FIFO samples (Samples 1 to 8).

FIG. 8 is a chart illustrating an optimal range of each of eight FIFO samples having the structure parameters shown in FIG. 6.

DESCRIPTION OF EMBODIMENTS

Technical Problem

Figure 1:
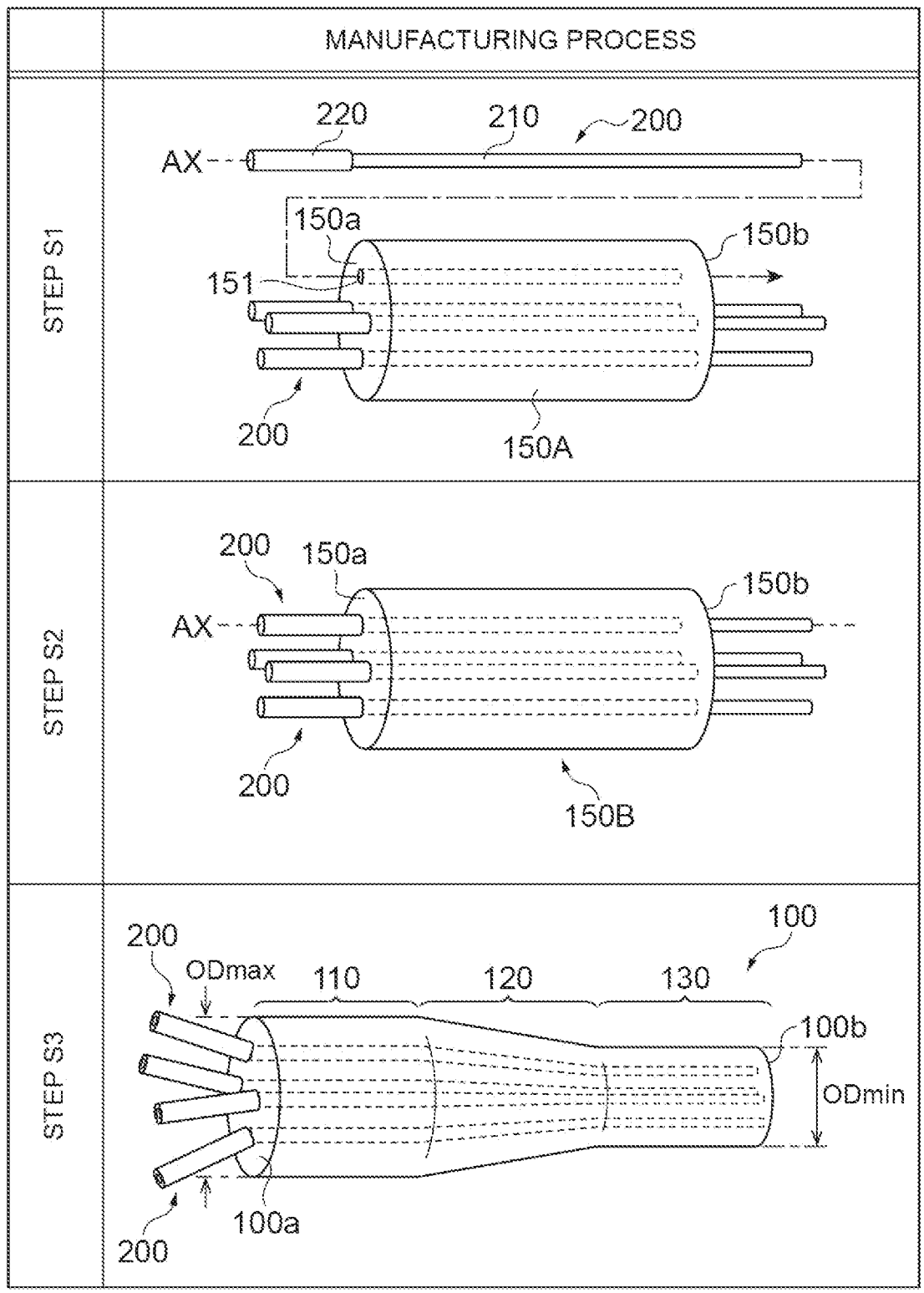
FIG. 1 is a diagram for describing an example of a process of manufacturing a fusion and elongation type FIFO device as an example of an optical connection device according to an embodiment of the present disclosure.

The inventors have found the following problems as a result of examining the above-mentioned related art. That is, in the manufacturing of the fusion and elongation type FIFO device, the same number of relay fibers as the number of cores of the MCF to be connected and a capillary having the same number of through-holes as the number of cores of the MCF are prepared. Before fusion, a size (area or maximum diameter) of both end faces (a surface facing the SCF is referred to as an "SCF-side end face" and a surface facing the MCF is referred to as an "MCF-side end face") of the capillary is greater than a size (area or maximum diameter) of the end face of the MCF. Thus, in a state where the relay fibers are respectively inserted into the through-holes, the capillary is elongated while being heated to such an extent that a core pitch of the MCF-side end face substantially coincides with a core pitch of the end face of the MCF. By this elongation, a tapered portion is formed in the capillary, and the core pitch is reduced from the plurality of SCF sides toward the MCF side.

As described above, in the fusion and elongation type FIFO device, not only the capillary but also the plurality of relay fibers integrated with the capillary are elongated while being heated. Thus, a refractive index profile and an electric field intensity distribution of each relay fiber greatly change between the SCF-side end face and the MCF-side end face of the capillary. It should be noted that a connection loss (insertion loss of the FIFO device) between the plurality of SCFs and MCFs optically connected via the FIFO device is mainly given by the sum of a transmission loss in each of the plurality of relay fibers included in the optical connection device and a coupling loss generated between the plurality of relay fibers and the plurality of cores of the MCF.

In the FIFO device of the related art, in order to reduce the coupling loss having a large influence on the connection loss as compared with the transmission loss, the refractive index profile of each relay fiber is adjusted such that a mode field diameter (hereinafter, referred to as "MFD") of each relay fiber on the MCF-side end face of the capillary substantially coincides with the MFD of the corresponding core on the MCF side. However, in the above-described related art, consideration is not given to the mismatch of the field intensity distribution between each relay fiber and the corresponding core on the MCF side which causes an increase in the coupling loss, and it is difficult to sufficiently reduce the connection loss.

The present disclosure has been made to solve the above-described problems, and an object of the present disclosure is to provide an optical connection device having a structure for effectively reducing a connection loss between one or more SCFs and an MCF.

Advantageous Effects of Invention

According to the optical connection device according to the present disclosure, the connection loss between one or more SCFs and the MCF can be effectively reduced.

DESCRIPTION OF EMBODIMENT OF PRESENT DISCLOSURE

Each relay fiber constituting a part of a FIFO device has a double core structure including a first core, a second core having a refractive index lower than a refractive index of the first core, and a cladding having a refractive index lower than the refractive index of the second core. In a fusion and elongation type FIFO, since a core pitch on an MCF-side end face coincides with a core pitch at an MCF end face, an area of the MCF-side end face is smaller than an area of an SCF-side end face (a tapered portion is formed). Due to such structural features, an outer diameter of the first core of each relay fiber decreases from the SCF-side end face toward the MCF-side end face. In confinement of light propagating in each relay fiber, the first core functions dominantly in a section close to the SCF-side end face (the first core functions as an optical waveguide region). On the other hand, since the outer diameter itself of the first core is small in a section close to the MCF-side end face, the light confinement by the second core gradually becomes dominant (the second core substantially functions as a waveguide region). However, when a radius of the first core on the SCF-side end face is equal to or greater than a certain value A, since the first core can also contribute to the light confinement on the MCF-side end face, as illustrated in the upper part of FIG. 5, even though an MFD of each relay fiber on the MCF-side end face coincides with an WD of each core of the MCF, an overlap integral of electric field intensity distributions becomes small due to the influence of the light confinement of the first core. That is, as an area of a shaded portion in the upper part of FIG. 5 increases, and as a result, a coupling loss due to FIFO device insertion increases.

In an embodiment of the present disclosure, in order to reduce the influence of the light confinement of the first core on the MCF end face of the FIFO device, the radius of the first core on the SCF end face and an outer diameter ratio of the MCF end face to the SCF end face are adjusted. A radius of the second core and a refractive index profile of the relay fiber are adjusted such that the light confinement by the second core is dominant on the MCF-side end face. In the present embodiment, the MFD is designed in a state where any control of the MFD can be performed. In this case, although the MFD of the relay fiber partially increases due to a change in the MFD in the vicinity of the tapered portion, in the embodiment of the present disclosure, the MFD is returned to a desired diameter in the section close to the MCF-side end face by adjusting the outer diameter ratio of the FIFO device to be small.

Hereinafter, contents of the embodiment of the present disclosure will be individually listed and described.

(1) An optical connection device according to the embodiment of the present disclosure includes a FIFO device having a structure for enabling optical connection with an SCF (single-core fiber) for each of a plurality of cores included in an MCF (multi-core fiber). Specifically, as one aspect, the FIFO device includes a plurality of relay fibers and a capillary. The plurality of relay fibers are provided in one-to-one correspondence with the plurality of cores of the MCF. Each relay fiber includes a first core, a second core provided so as to surround the outer periphery of the first core, and a cladding provided so as to surround the outer periphery of the second core. The first core has a relative refractive index difference (first relative refractive index difference) $\Delta1(\%)$, the second core has a relative refractive index difference (second relative refractive index difference) $\Delta2(\%)$ lower than the relative refractive index difference $\Delta1$, and the cladding has a relative refractive index difference (third relative refractive index difference) Δ3(%) lower than the relative refractive index difference Δ2. It should be noted that all the relative refractive index differences Δ1, Δ2, and Δ3 of the first core, the second core, and the cladding are relative refractive index differences at a wavelength of 589 nm defined with pure silica ($SiO_2$) as a reference. The capillary has a third end face (SCF-side end face) and a fourth end face (MCF-side end face) arranged to be opposite to each other, and integrally holds each of the plurality of relay fibers extending from the third end face toward the fourth end face. A distal end portion including the first end faces of the plurality of relay fibers protrudes from the third end face. The fourth end face is a face facing the end face of the MCF, and the second end faces of the plurality of relay fibers are arranged (the fourth end face and the second end face of the plurality of relay fibers coincide with each other). The capillary includes a tapered portion provided between the third end face and the fourth end face. The FIFO device satisfies the following Conditions 1 to 3.

Condition 1 is defined by "the tapered portion has an outer diameter ratio R of 0.2 or less defined by $OD_{MIN}/OD_{MAX}$ which is a ratio of an outer diameter $OD_{MIN}$ of the fourth end face to an outer diameter $OD_{MAX}$ of the third end face". Condition 2 is defined by "each MFD of the SCF and the MCF to be optically connected via the FIFO device is in a range of 8.6 μm or more and 9.2 μm or less". Condition 3 is defined by "each of the plurality of relay fibers is configured such that a value defined by the following Formula (1) falls within a range of 156% μm² or more and 177% μm² or less".

$$(V2-V1)/R \quad (1)$$ where:

V1: refractive index volume (% μm²) given by a product $((\pi \cdot r1_b^2) \times (\Delta1 - \Delta2))$ of a cross-sectional area of the fourth end face defined by a radius $r1_b$ (μm) of the first core and a difference $(\Delta1 - \Delta2)$ between the first and second relative refractive index differences V2: refractive index volume (% μm²) given by a product $((\pi \cdot r2_b^2) \times (\Delta2 - \Delta3))$ of a cross-sectional area of the fourth end face defined by a radius $r2_b$ (μm) of the second core and a difference $(\Delta2 - \Delta3)$ between the second and third relative refractive index differences.

(2) As one aspect of the present disclosure, in each of the plurality of relay fibers, the first core or the second core is preferably comprised of pure silica. Pure silica not containing a refractive index adjuster such as Ge or F is applied to a portion contributing to light propagation, and thus, it is possible to reduce variations in a shape of the refractive index profile along a radial direction among the plurality of relay fibers held by one capillary (shape stabilization of the refractive index profile).

(3) As one aspect of the present disclosure, the FIFO device preferably satisfies the following Condition 4. Condition 4 is defined by "$r2_a/r1_a$ which is a ratio of a radius $r2_a$ of the second core to a radius $r1_a$ of the first core defined on the third end face is greater than 5.0". In this manner, the first core is set to be smaller than the second core, and thus, light is not substantially guided to the first core on the MCF-side end face. Accordingly, it is possible to decrease a connection loss by increasing the overlap integral of the field intensity distributions of the MCF and the FIFO.

(4) As one aspect of the present disclosure, the capillary preferably includes a first stationary portion and a second stationary portion in addition to the tapered portion. The first stationary portion is provided between the third end face and the tapered portion in a state of including the third end face. The second stationary portion is provided between the fourth end face and the tapered portion in a state of including the fourth end face. In the first stationary portion, a minimum outer diameter of a cross section intersecting a reference direction from the third end face to the fourth end face is maintained at the same diameter from the third end face toward the fourth end face. In the second stationary portion, a minimum outer diameter of a cross section intersecting the reference direction from the third end face toward the fourth end face is maintained at the same diameter from the third end face toward the fourth end face.

(5) As one aspect of the present disclosure, when a length of the first stationary portion defined along the reference direction is Lw, a length of the tapered portion defined along the reference direction is Lt, and a length of the second stationary portion along the reference direction is Ln, the optical connection device preferably satisfies the following Condition 5. Condition 5 is "a sum of the length Lt of the tapered portion and the length Ln of the second stationary portion: a ratio of the length Lw of the first stationary portion to Lt+Ln, and a ratio defined by the following Formula (2) falls within a range of 0.5 or more and 30 or less".

$$Lw/(Lt+Ln) \quad (2)$$

As described above, each of the aspects listed in [Description of Embodiment of Present Disclosure] is applicable to each of all the remaining aspects or all combinations of these remaining aspects.

DETAILS OF EMBODIMENT OF PRESENT DISCLOSURE

Specific examples of an optical connection device according to the present disclosure will be described in detail with reference to the accompanying drawings. It should be noted that the present disclosure is not limited to these examples, and is intended to be defined by the claims and to include all modifications within the scope of the claims and their equivalents. In the description of the drawings, the same components are denoted by the same reference signs, and the redundant description will be omitted.

Figure 2:
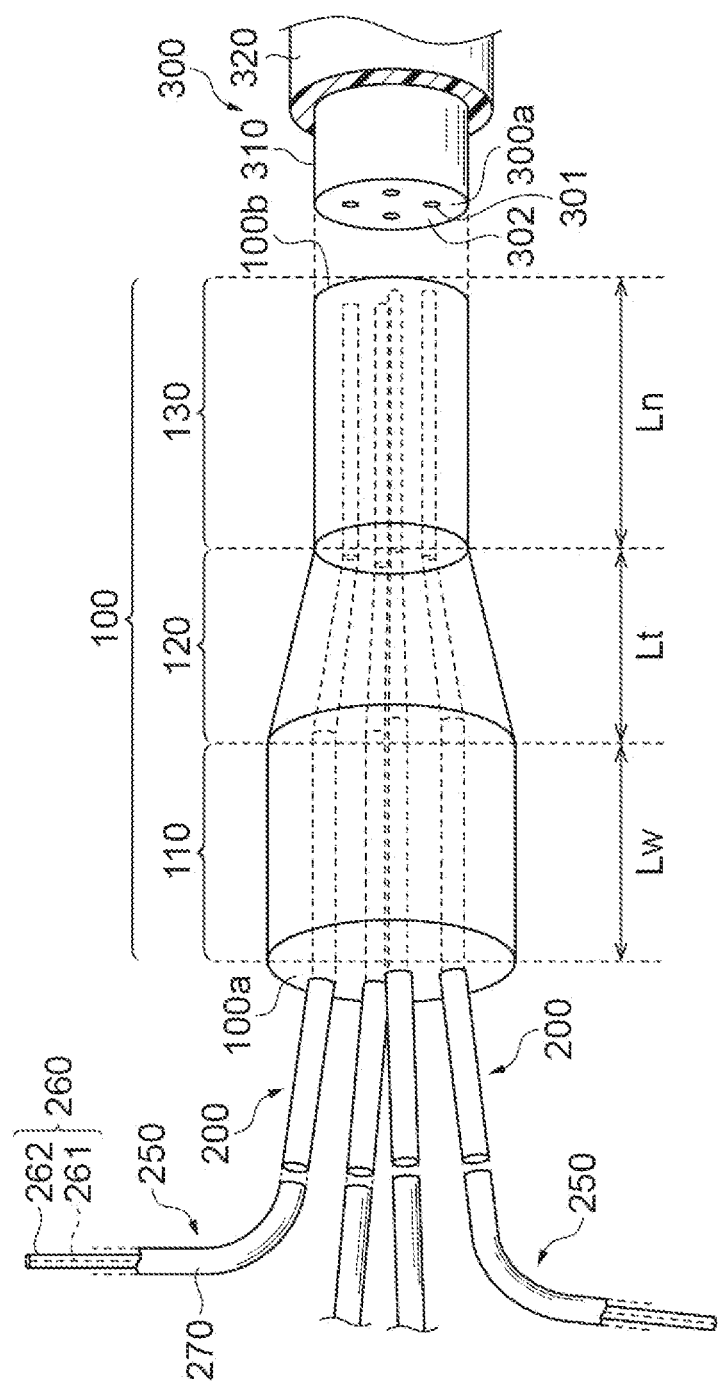
FIG. 2 is a diagram illustrating a configuration of the FIFO device obtained through the manufacturing process of FIG. 1.
Figure 3:
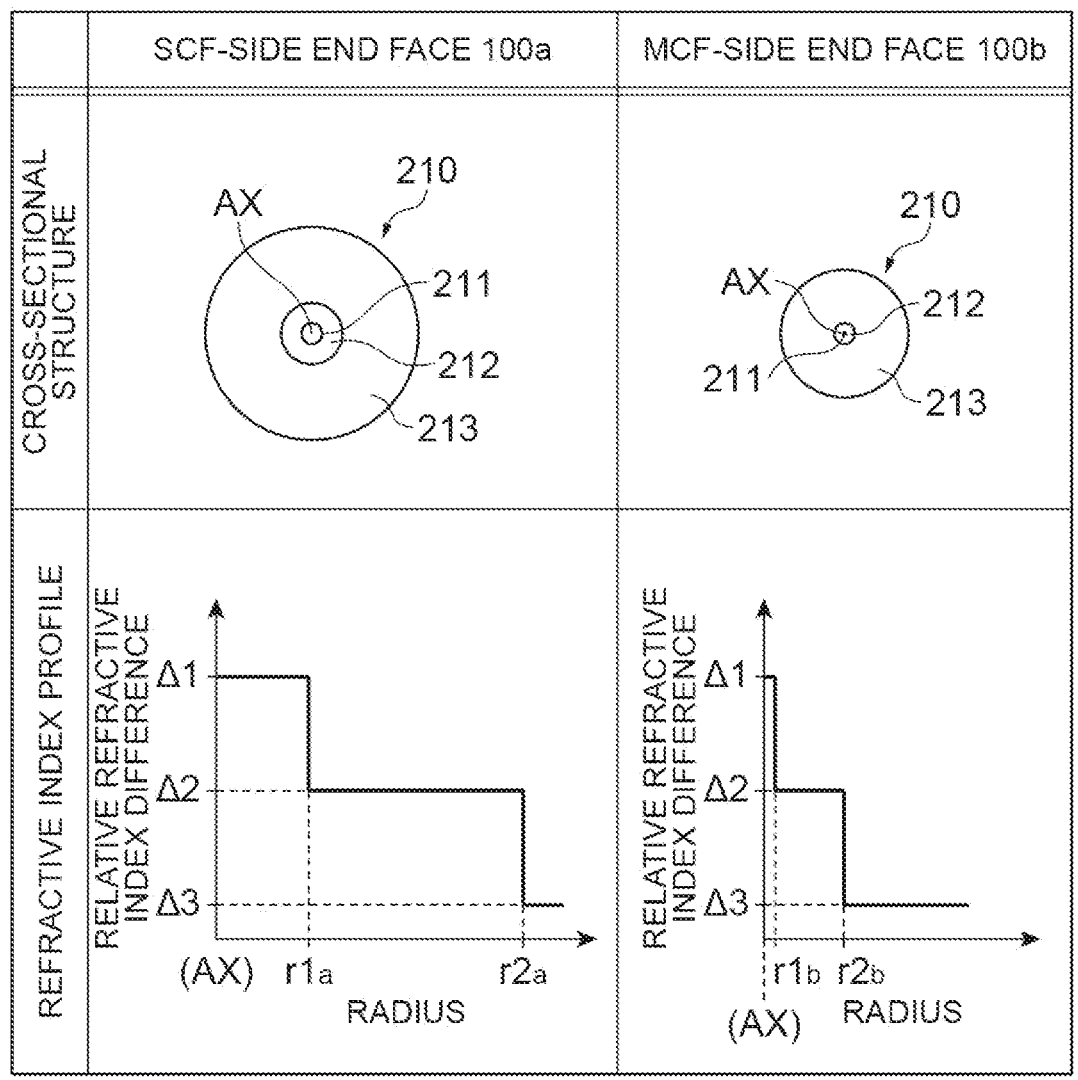
FIG. 3 is a cross-sectional structure and a refractive index profile of a relay fiber in each portion of the FIFO device illustrated in FIG. 2.

FIG. 1 is a diagram for describing an example of a process of manufacturing a fusion and elongation type FIFO device as an example of the optical connection device according to the embodiment of the present disclosure. FIG. 2 is a diagram illustrating a configuration of the FIFO device obtained through the manufacturing process of FIG. 1. FIG. 3 is a cross-sectional structure and a refractive index profile of a relay fiber in each portion of the FIFO device illustrated in FIG. 2.

First, in order to obtain the fusion and elongation type FIFO device (the optical connection device according to the embodiment), in step S1 illustrated in FIG. 1, a capillary 150A having through-holes 151 having the same number as the number of cores 301 included in an MCF 300 to be connected and relay fibers 200 having the same number as the number of through-holes 151 are prepared.

The relay fiber 200 includes a bare fiber 210 extending along an optical axis AX and a resin coating 220 provided on an outer periphery of the bare fiber 210. However, the resin coating 220 is removed from the portion (bare fiber 210) of the capillary 150A to be inserted into the through-hole 151. The capillary 150A has an SCF-side end face 150a and an MCF-side end face 150b where openings on both sides of the through-hole 151 are positioned, and the arrangement of the through-holes 151 on the MCF-side end face 150b corresponds to the arrangement of the cores 301 of the MCF 300 to be connected.

Subsequently, in step S2 illustrated in FIG. 1, the capillary 150A is heated in a state where the portions (bare fibers 210) of the relay fibers 200 from which the resin coatings 220 are removed are inserted into the through-holes 151, and thus, the integrated capillary 150B is obtained. After the integration, a first end portion of the relay fiber 200 covered with the resin coating 220 protrudes from the SCF-side end face 150a of the integrated capillary 150B, while a second end portion opposite to the first end portion of the relay fiber 200 protrudes from the MCF-side end face 150b.

In step S3 shown in FIG. 1, an intermediate portion of the integrated capillary 150B obtained in step S2 described above is elongated while being heated. After this elongation operation, a distal end of the integrated capillary 150B including the end portion of the MCF-side end face 150b is cut to obtain the FIFO device 100 in which the tapered portion 120 is provided.

The extended capillary (substantially the main body of the FIFO device 100) has an SCF-side end face 100a and an MCF-side end face 100b corresponding to the SCF-side end face 150a and the MCF-side end face 150b of the integrated capillary 150B, respectively. A portion of the relay fiber 200 covered with the resin coating 220 protrudes from the SCF-side end face 100a. The MCF-side end face 100b coincides with a cut end face of each of the relay fibers 200. In addition to the tapered portion 120 described above, the FIFO device 100 further includes a first stationary portion 110 provided between the SCF-side end face 100a and the tapered portion 120, and a second stationary portion 130 provided between the MCF-side end face 100b and the tapered portion 120. Both the first stationary portion 110 and the second stationary portion 130 are portions in which a cross-sectional outer diameter (an outer diameter of a cross section intersecting a longitudinal direction) is maintained substantially at a constant value along the longitudinal direction of the FIFO device 100 (a reference direction from the SCF-side end face 100a toward the MCF-side end face 100b). Typically, an outer diameter variation of the first stationary portion is equal to or less than 5% with respect to a center value, and an outer diameter variation of the second stationary portion is equal to or less than 10% respect to the central value. In the FIFO device 100 in which the tapered portion 120 is provided, a maximum outer diameter $OD_{MAX}$ of the SCF-side end face 100a is greater than a maximum outer diameter $OD_{MIN}$ of the MCF-side end face 100b.

As illustrated in FIG. 2, the FIFO device 100 manufactured as described above optically connects the plurality of SCFs 250 and the cores 301 of the MCFs 300 in one-to-one correspondence. Specifically, one end face of the SCF 250 is connected to the first end portion of the relay fiber 200 exposed from the SCF-side end face 100a in a fusion-connected or connectorized state. It should be noted that each SCF 250 includes a bare fiber 260 including a core 261 extending along the optical axis AX and a cladding 262 provided on an outer periphery of the core 261, and a resin coating 270 provided on an outer periphery of the bare fiber 260. On the other hand, the MCF 300 includes a bare fiber 310 including a plurality of cores 301 and a common cladding 302 surrounding the plurality of cores 301, and a resin coating 320 provided on an outer periphery of the bare fiber 310. The MCF-side end face 100b is fusion-connected to an end face 300a of the MCF 300 or is connected in a connectorized or fiber-arrayed state.

In the FIFO device 100, the first stationary portion 110 has a length Lw, the tapered portion 120 has a length Lt, and the second stationary portion 130 has a length Ln. At this time, the FIFO device 100 is designed to satisfy the above Condition 5 in consideration of ease of manufacturing and ease of mounting. That is, a ratio of the length Lw of the first stationary portion 110 to a sum of the length Lt of the tapered portion 120 and the length Ln of the second stationary portion 130, which is a ratio defined by the above Formula (2), falls within a range of 0.5 or more and 30 or less. In order to effectively suppress a coupling loss between the FIFO device 100 and the MCF 300, the FIFO device 100 is designed to satisfy the above Condition 1. That is, an outer diameter ratio R defined by $OD_{MIN}/OD_{MAX}$ which is a ratio of the maximum outer diameter $OD_{MIN}$ of the MCF-side end face 100b to the maximum outer diameter $OD_{MAX}$ of the SCF-side end face 100a is set to 0.2 or less.

In the FIFO device 100, the tapered portion 120 is provided between the first and second stationary portions 110 and 130. Thus, as illustrated in FIG. 3, in the cross-sectional structure of the relay fiber 200 constituting a part of the FIFO device 100, the cross-sectional structure and the refractive index profile are different. That is, the bare fiber 210 included in the relay fiber 200 includes a first core 211 including the optical axis AX and having a relative refractive index difference Δ1, a second core 212 surrounding the first core 211 and having a relative refractive index difference Δ2, and a cladding 213 surrounding the second core 212 and having a relative refractive index difference Δ3. The first core 211 has a radius $r1_a$ on the SCF-side end face 100a and a radius $r1_b$ on the MCF-side end face 100b. The second core 212 has a radius $r2_a$ on the SCF-side end face 100a and a radius $r2_b$ on the MCF-side end face 100b.

In the MCF-side end face 100b, the radius $r1_b$ of the first core 211 and the radius $r2_b$ of the second core 212 satisfy the above Condition 3. Specifically, in each of the plurality of relay fibers 200, a value defined by (V2−V1)/R which is the above Formula (1) falls within a range of 156% μm² or more and 177% μm² or less. Here, a refractive index volume V1(% μm²) is given by a product $((\pi \cdot r1_b^2) \times (\Delta1 - \Delta2))$ of a cross-sectional area defined by the radius $r1_b$ (μm) of the first core 211 on the MCF-side end face 100b and a first value (Δ1−Δ2) obtained by subtracting the relative refractive index difference Δ2 from the relative refractive index difference Δ1. A refractive index volume V2(% μm²) is given by a product $((\pi \cdot r2_b^2) \times (\Delta2 - \Delta3))$ of a cross-sectional area defined by the radius $r2_b$ (μm) of the second core on the MCF-side end face 100b and a second value (Δ2−Δ3) obtained by subtracting the relative refractive index difference Δ3 from the relative refractive index difference Δ2. It should be noted that the outer diameter ratio R is an outer diameter ratio of the MCF-side end face 100b to the SCF-side end face 100a. In order to enable any control of the electric field intensity distribution, an outer diameter $2r1_a$ of the first core 211 and an outer diameter $2r2_a$ of the second core 212 are designed to satisfy the above Condition 4. That is, $r2_a/r1_a$ (synonymous with an outer shape ratio of the first core 211 and the second core 212) which is a ratio of the radius $r2_a$ of the second core 212 to the radius $r1_a$ of the first core 211 is greater than 5.0. At this time, the refractive index profile of each relay fiber 200 on the SCF-side end face 100a and the MCF-side end face 100b is designed to satisfy the above Condition 2. That is, the optical connection device of the present disclosure assumes the SCF and the MCF having the MFD in a range of 8.6 μm or more and 9.2 μm or less. It should be noted that, in the present specification, when a refractive index of pure silica is $n_0$ and a refractive index of each portion is n, the relative refractive index difference Δ is given by the following Formula (3).

$$(n - n_0)/n_0 \qquad (3)$$

On the other hand, on the MCF-side end face 100b, the radius $r1_b$ of the first core 211 becomes small to the extent that light cannot be guided. Thus, a subject of the light confinement on the MCF-side end face 100b is the second core 212. The refractive index profile of each relay fiber 200 on the MCF-side end face 100b satisfies the above Condition 2, but the radius $r1_b$ of the first core 211 and the radius $r2_b$ of the second core 212 on the MCF-side end face 100b are significantly reduced as compared with the radius $r1_a$ of the first core 211 and the radius $r2_a$ of the second core 212 on the SCF-side end face 100a.

Figure 4:
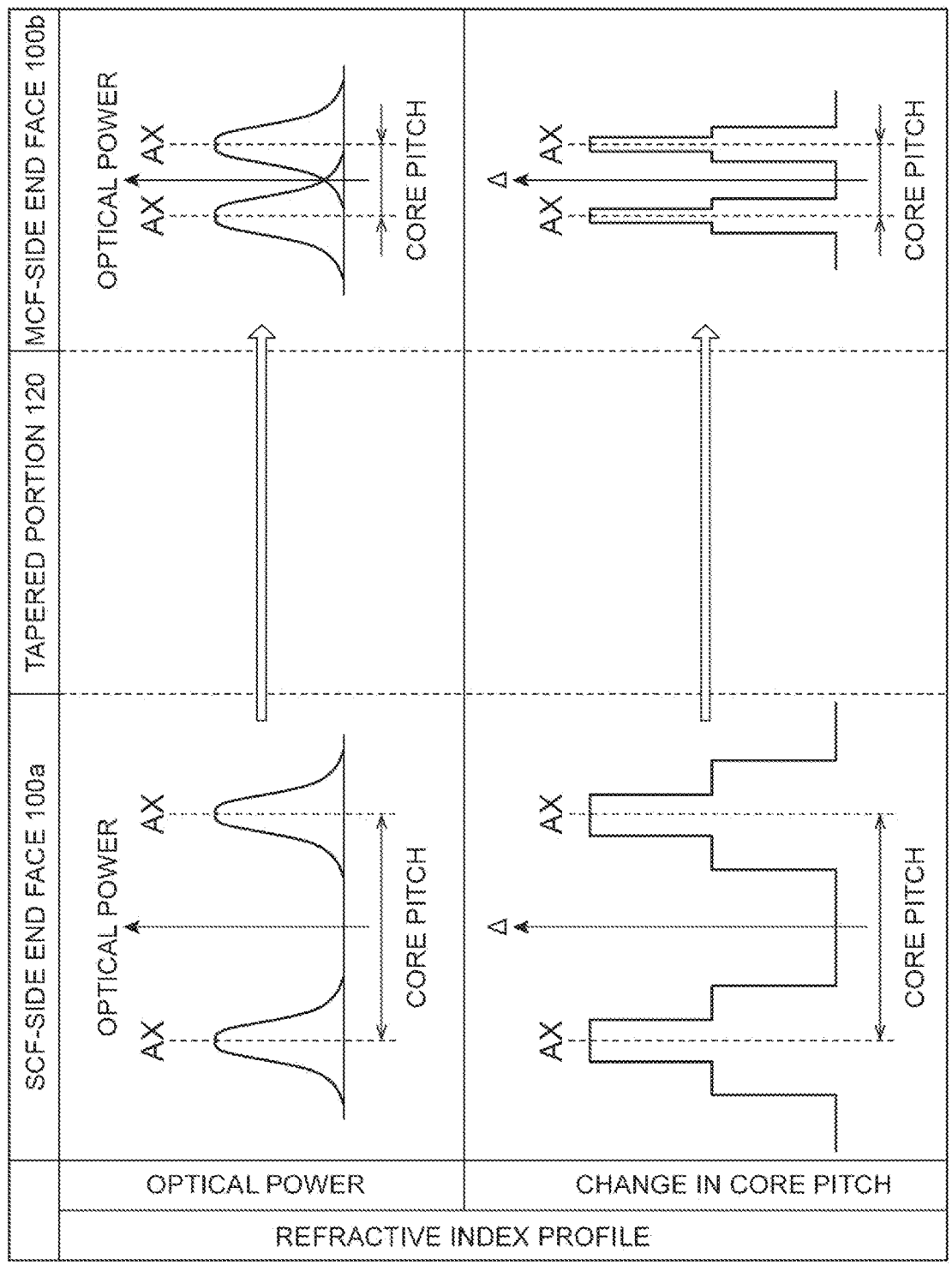
FIG. 4 is a conceptual diagram for describing a change in a core pitch in each portion of the FIFO device illustrated in FIG. 2.
Figure 5:
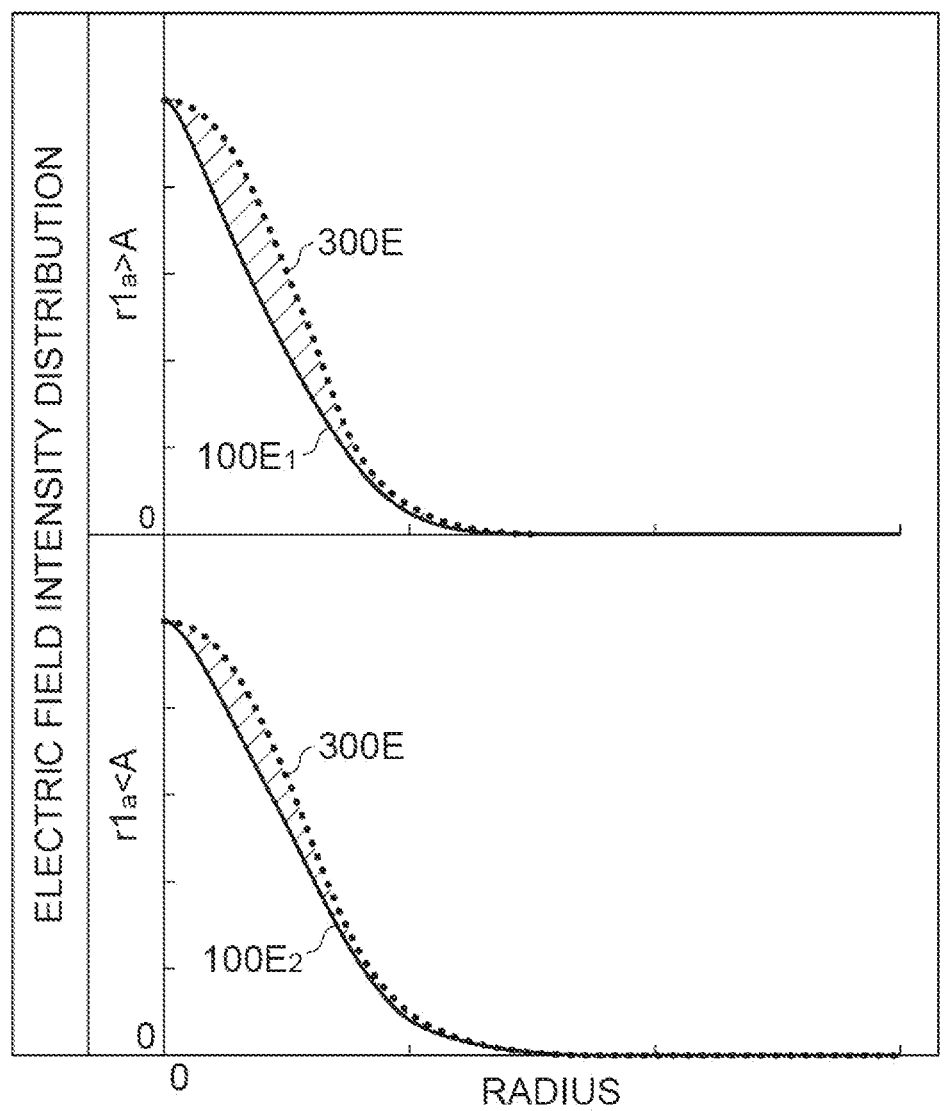
FIG. 5 is a conceptual diagram for describing a relationship between an overlap integral of a field intensity distribution and a connection loss between the FIFO device and an MCF.

FIG. 4 is a conceptual diagram for describing a change in a core pitch in each portion of the optical connection device illustrated in FIG. 2. FIG. 5 is a conceptual diagram for describing a relationship between an overlap integral of a field intensity distribution between the optical connection device and the MCF and a connection loss.

As illustrated in FIG. 4, on the SCF-side end face 100a, light confinement of propagation light by the first core 211 is dominant. Light having such an optical power propagates through a section of each relay fiber 200 corresponding to the first stationary portion 110, and then travels toward the tapered portion 120. Light from the tapered portion 120 toward the MCF-side end face 100b propagates through a section of the relay fiber 200 corresponding to the second stationary portion 130. In this section, the refractive index profile of each relay fiber 200 has a shape compressed in a radial direction, and light confinement by the second core 212 is dominant.

It should be noted that, as described above, when the radius $r1_a$ of the first core 211 on the SCF-side end face 100a is equal to or greater than a certain value A, since the first core 211 can also contribute to light confinement on the MCF-side end face 100b, even though the MFD of each relay fiber 200 on the MCF-side end face 100b coincides with the MFD of each core 301 of the MCF 300 as illustrated in the upper part of FIG. 5, the overlap integral of the electric field intensity distributions becomes small due to the influence of the light confinement of the first core 211. That is, an area of a shaded portion sandwiched between an electric field intensity distribution $100E_1$ of each relay fiber 200 and an electric field intensity distribution 300E of each core 301 of the MCF 300 increases. On the other hand, according to the FIFO device 100 of the present embodiment, the first core 211 hardly contributes to light propagation on the MCF-side end face 100b. Thus, as illustrated in a lower part of FIG. 5, an area of a shaded portion sandwiched between an electric field intensity distribution $100E_2$ of each relay fiber 200 and the electric field intensity distribution 300E of each core 301 of the MCF 300 is significantly smaller than an area of the example in the upper part (decrease in connection loss).

Next, structural conditions of the FIFO device 100 according to the present embodiment will be examined by preparing a plurality of samples. FIG. 6 is a chart illustrating the MCF and the SCF constituting a measurement system of the connection loss between the MCF and the SCF, and each structure parameter of a FIFO sample for each of eight FIFO samples (Samples 1 to 8). Among the eight prepared FIFO samples, SCFs 250 having an MFD of 9.2 µm are arranged on SCF-side end faces 100a of Sample 1, Sample 2, Sample 5, and Sample 6, and SCFs 250 having an MFD of 8.6 µm are arranged on SCF-side end faces 100a of Sample 3, Sample 4, Sample 7, and Sample 8. MCFs 300 having an MFD of 9.2 µm are arranged on MCF-side end faces 100b of Samples 1 to 4, and MCFs 300 having an MFD of 8.6 µm are arranged on MCF-side end faces 100b of Samples 5 to 8.

Outer diameter ratio R of each of Samples 1 to 8 is set to 0.16 or 2.0. With respect to the difference Δ1–Δ2 at a wavelength of 589 nm, the range set for each of Samples 1 to 8 is a range of 0.30% or more and 0.4% or less, or a range of 0.35% or more and 0.45% or less. In each of Samples 1 to 8, the radius $r1_a$ of the first core 211 on the SCF-side end face 100a of each relay fiber 200 is 4.25±0.25 µm (4.0 µm or more and 4.5 µm or less) in order to be connected to the SCF 250 with a low loss. In each of Samples 1 to 8, the radii $r1_b$ of the first cores 211 on the MCF-side end faces 100b of the relay fibers 200 are 0.68 µm and 0.85 µm.

Figure 7A:
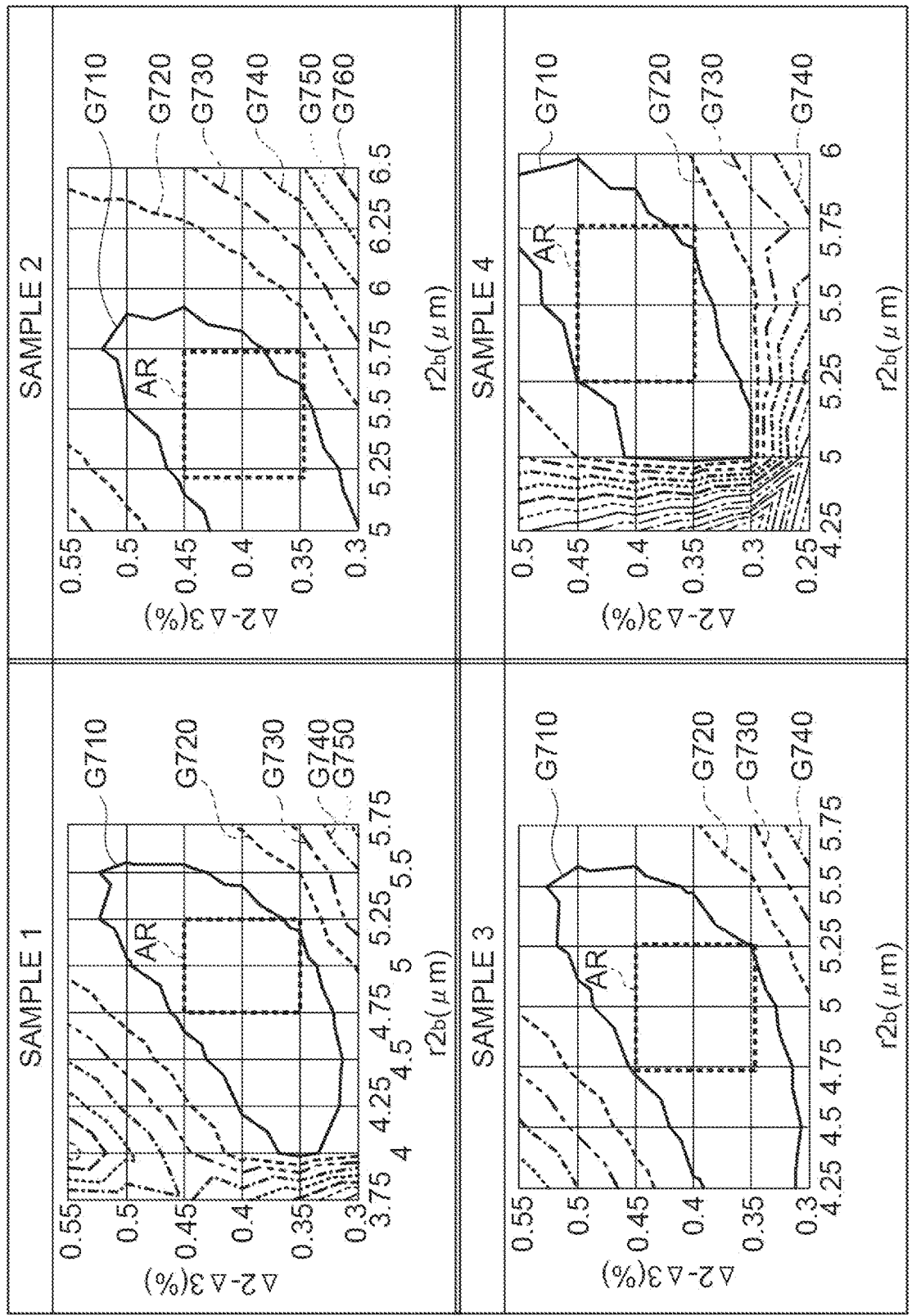
FIG. 7A is a graph plotting calculation results of connection losses of Samples 1 to 4 among eight FIFO samples having the structure parameters illustrated in FIG. 6.
Figure 7B:
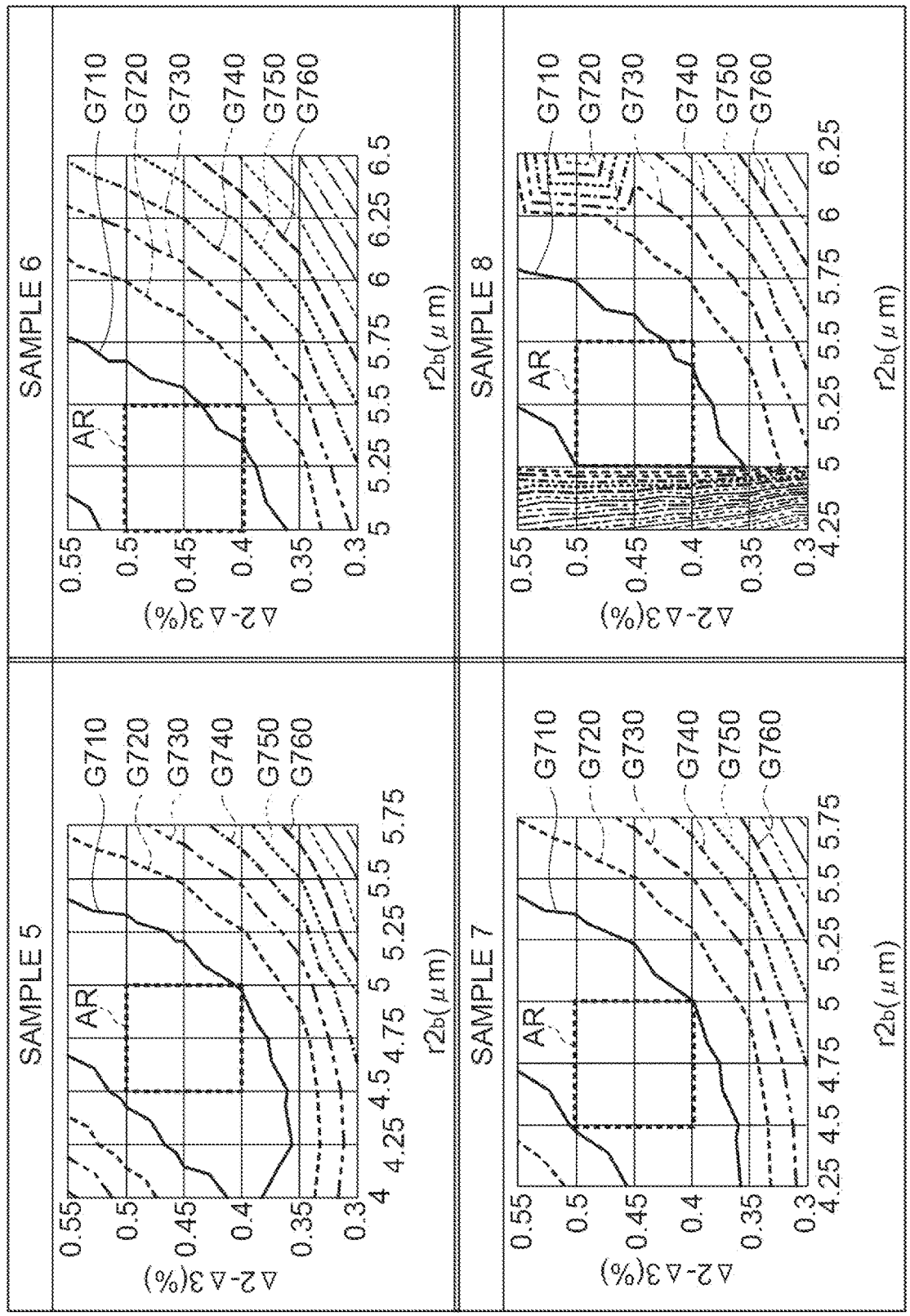
FIG. 7B is a graph plotting calculation results of connection losses of Samples 5 to 8 among eight FIFO samples having the structure parameters shown in FIG. 6.

For Samples 1 to 8 of the FIFO samples having the above structure, the calculation results of the connection loss between the MCF and the SCF are shown in FIGS. 7A and 7B. It should be noted that, in the calculation results of Samples 1 to 8 shown in FIGS. 7A and 7B, a vertical axis represents the difference Δ2–Δ3, and a horizontal axis represents the radius $r2_b$ of the second core 212 on the MCF-side end face 100b. In each calculation result of FIGS. 7A and 7B, G710 indicates a range in which the connection loss is greater than 0 dB and equal to or less than 0.02 dB, G720 indicates a range in which the connection loss is greater than 0.02 dB and equal to or less than 0.04 dB, G730 indicates a range in which the connection loss is greater than 0.04 dB and equal to or less than 0.06 dB, G740 indicates a range in which the connection loss is greater than 0.06 dB and equal to or less than 0.08 dB, G750 indicates a range in which the connection loss is greater than 0.08 dB and equal to or less than 0.10 dB, and G760 indicates a range in which the connection loss is greater than 0.10 dB and equal to or less than 0.12 dB. The remaining lines are also shown at 0.02 dB intervals. In addition, a region AR surrounded by a broken line indicates an optimum range of each measurement result of Samples 1 to 8.

The structural parameters illustrated in FIG. 8 are structural parameters of samples that fall within the range (region AR indicating an optimum range) in which the connection loss is greater than 0 dB and equal to or less than 0.02 dB, which is indicated by line G710, among the lines illustrated in FIGS. 7A and 7B. That is, for each of Samples 1 to 8, in order to set the connection loss to be in the range of more than 0 dB and 0.02 dB or less, an optimum range of the difference Δ2–Δ3 at a wavelength of 589 nm needs to be equal to or greater than 0.35% and equal to or less than 0.45%, or to be equal to or greater than 0.40% and equal to or less than 0.50%. An optimum range of the radius $r2_b$ of the second core 212 on the MCF-side end face 100b needs to be equal to or greater than 4.75 µm more and equal to or less than 5.25 µm, equal to or greater than 5.25 µm and equal to or less than 5.75 µm, equal to or greater than 4.50 µm and equal to or less than 5.0 µm, or equal to or greater than 5.0 µm or more and equal to or less than 5.50 µm. "$r2_a$ (µm)" in FIG. 8 is a value calculated from the radius $r2_b$ described above and the outer diameter ratio R of each sample illustrated in FIG. 6. The refractive index volume V1(% µm²), the refractive index volume V2(% µm²), and the value defined by (V2−V1)/R which is the above Formula (1) are also calculated by using the above-described radius $r2_b$ (see Formula (1)). It should be noted that, in FIG. 8, $r2_a/r1_a$ which is the ratio of the radius $r2_a$ of the second core 212 to the radius $r1_a$ of the first core 211 on the SCF-side end face 100a is also illustrated for each sample. Accordingly, a common range of the values defined by (V2−V1)/R which is the above Formula (1) calculated by using the values of the condition range of FIG. 6 and the optimum range of FIG. 8 is equal to or greater than 156% μm² and equal to or less than 177% μm².

Figure 9:
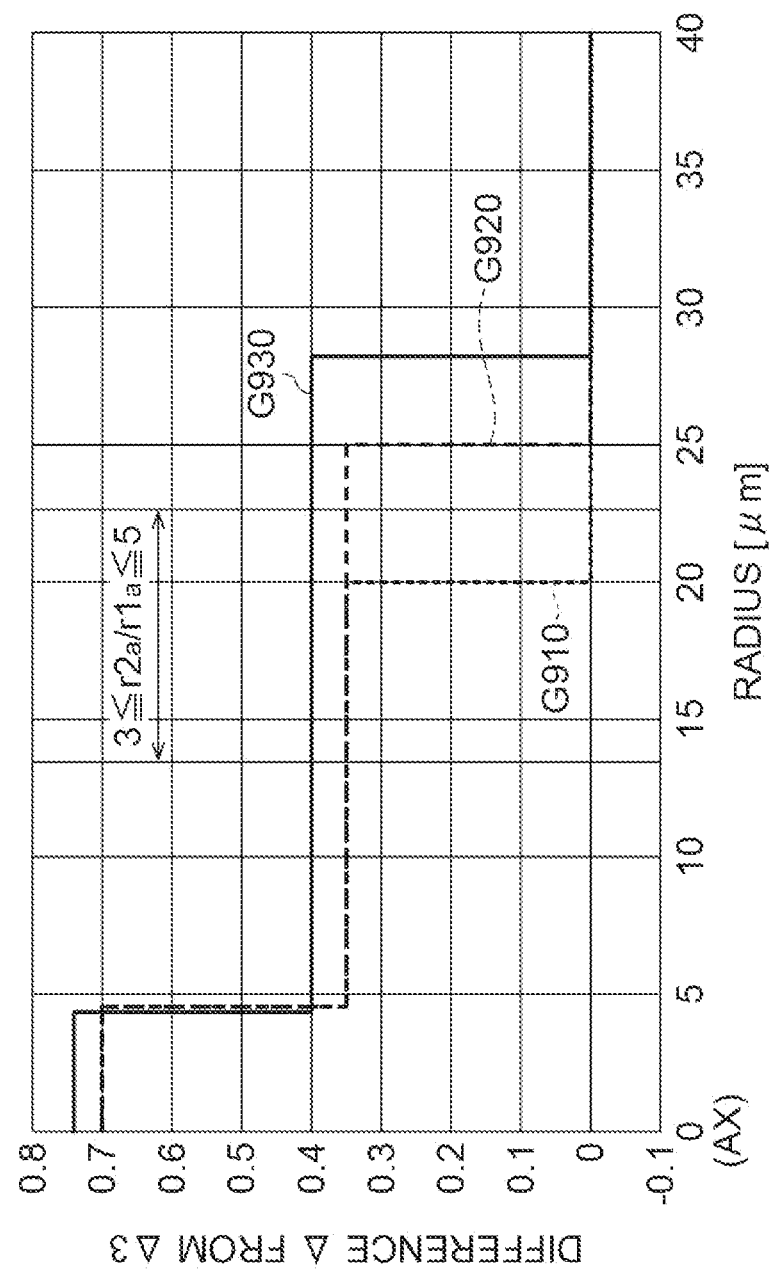
FIG. 9 is an example of a refractive index profile on an SCF-side end face for each of the FIFO samples according to the embodiment of the present disclosure and a FIFO sample according to a comparative example.
Figure 10A:
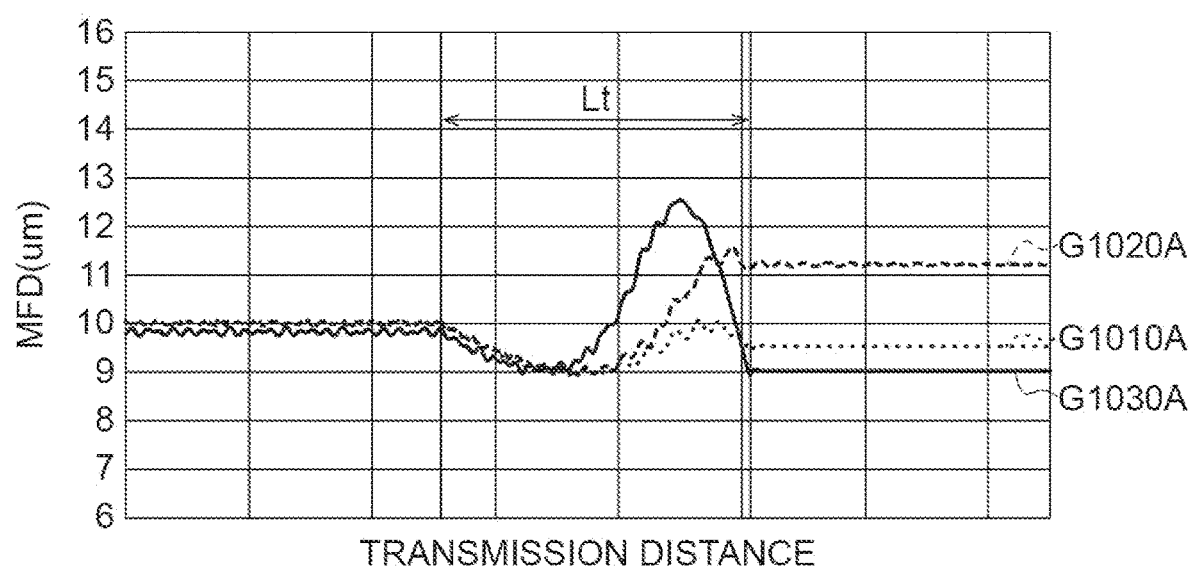
FIG. 10A is a graph representing a change in MFD with respect to a transmission distance for each of the FIFO samples according to the embodiment of the present disclosure and the FIFO sample according to the comparative example.
Figure 10B:
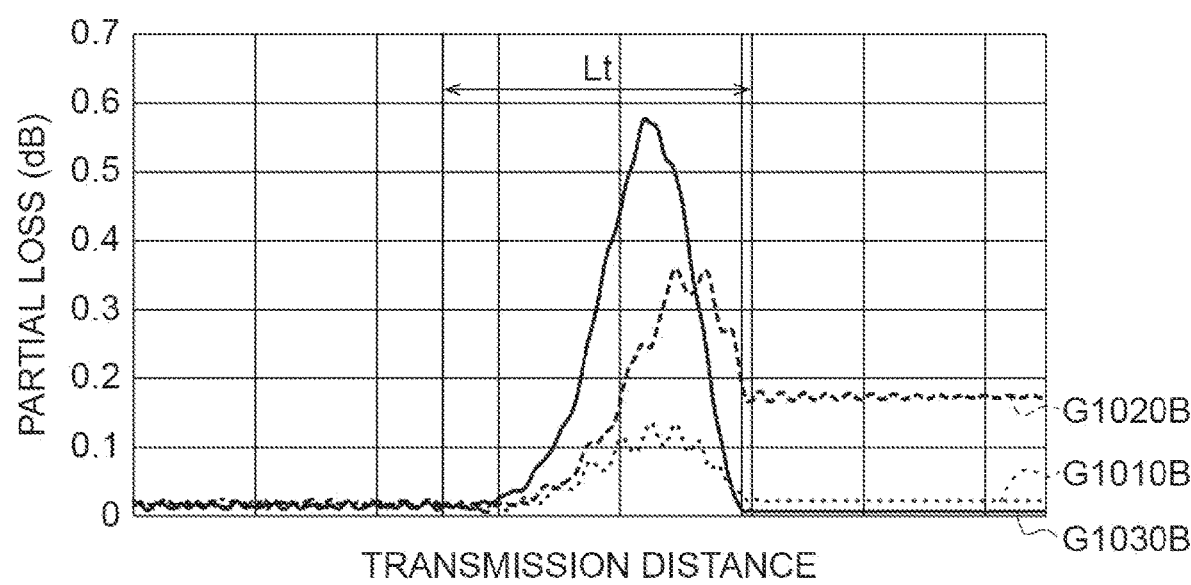
FIG. 10B is a graph representing a change in a loss a (dB) due to the overlap integral of the electric field intensity distribution with the MCF at each transmission distance for each of the FIFO samples according to the embodiment of the present disclosure and the FIFO sample according to the comparative example.

Next, a change in the MFD of light propagating inside the FIFO device and a loss (hereinafter, referred to as a loss a (dB)) calculated by an overlap integral of an electric field distribution at each transmission distance and an electric field distribution of the MCF 300 is verified by using various samples. It should be noted that, FIG. 9 is an example of a refractive index profile of an SCF-side end face 100a for each of the FIFO sample according to the embodiment of the present disclosure and a FIFO sample according to a comparative example. FIG. 10A is a graph representing a change in MFD with respect to a transmission distance for each of the FIFO sample according to the embodiment of the present disclosure and the FIFO sample according to the comparative example. FIG. 10B is a graph representing a change in loss (loss a) calculated by an overlap integral of an electric field distribution at each transmission distance and an electric field distribution of an MCF 300 for each of the FIFO sample according to the embodiment of the present disclosure and the FIFO sample according to the comparative example. This verification is performed for a case where an SCF 250 having an MFD of 9.2 μm at a wavelength of 1310 nm and a core 301 of an MCF 300 having an MFD of 8.6 μm at a wavelength of 1310 nm are optically connected.

In FIG. 9, G910 indicates a refractive index profile of a FIFO sample according to Comparative Example 1, G920 indicates a refractive index profile of a FIFO sample according to Comparative Example 2, and G930 indicates a refractive index profile of a FIFO sample (hereinafter, referred to as a "FIFO sample of the present embodiment") according to the embodiment of the present disclosure. In any of the FIFO samples of Comparative Example 1, Comparative Example 2, and the present embodiment, the radius $r1_a$ of the first core on the SCF-side end face is 4.28 μm. In the FIFO sample of Comparative Example 1, $r2_a/r1_a$ which is the ratio of the outer diameter $2r2_a$ of the second core to the outer diameter $2r1_a$ of the first core defined on the SCF-side end face is set in a range of 3 or more and 5 or less. In each of the FIFO samples of Comparative Example 2 and the present embodiment, the ratio $r2_a/r1_a$ exceeds 5, and is designed in a state where any control of the MFD is can be performed. However, in each of the FIFO samples of Comparative Example 1 and Comparative Example 2, the outer diameter ratio R is set to 1/3.4, that is, 0.294, whereas in the FIFO sample of the present embodiment, the outer diameter ratio R is set to 1/6.4, that is, 0.156. That is, in each of the FIFO samples of Comparative Example 1 and Comparative Example 2, the outer diameter ratio R is greater than 0.2, and in the FIFO sample of the present embodiment, the outer diameter ratio R is set to be equal to or less than 0.2. It should be noted that, in all of the FIFO sample of the present embodiment, the FIFO sample of Comparative Example 1, and the FIFO sample of Comparative Example 2 which are prepared, the value of the difference Δ1−Δ2 and the value of the difference Δ2−Δ3 are substantially the same. In addition to the outer diameter ratio R described above, the radius of the second core 212 is different between these FIFO samples.

FIGS. 10A and 10B illustrate optical characteristics having the above-described structure. It should be noted that, in FIG. 10A, a graph G1010A indicates a change in the MFD in the FIFO sample according to Comparative Example 1, a graph G1020A indicates a change in the MFD in the FIFO sample according to Comparative Example 2, and a graph G1030A indicates a change in the MFD in the FIFO sample according to the embodiment of the present disclosure. In FIG. 10B, a graph G1010B indicates a change in loss a in the FIFO sample according to Comparative Example 1, a graph G1020B indicates a change in loss a in the FIFO sample according to Comparative Example 2, and a graph G1030B indicates a change in loss a in the FIFO sample according to indicates embodiment of the present disclosure.

As can be seen from FIG. 10A, in the case of the FIFO sample of Comparative Example 1, the change in the MFD in the tapered portion 120 (section of the length Lt) is small. On the other hand, in the case of each of the FIFO samples of Comparative Example 2 and the present embodiment, the MFD greatly changes in the tapered portion 120. However, in the case of the FIFO sample of Comparative Example 2, the MFD also remains enlarged in the section (second stationary portion 130) from the tapered portion 120 toward the MCF-side end face 100b. On the other hand, in the case of the FIFO sample of the present embodiment, the MFD enlarged by the tapered portion 120 is reduced to an original diameter in the section (second stationary portion 130) from the tapered portion 120 toward the MCF-side end face 100b. This is because the outer diameter ratio R is set as small as 1/6.4 as described above. That is, in the FIFO sample having such a small outer diameter ratio R, the first core 211 in the section (second stationary portion 130) from the tapered portion 120 toward the MCF-side end face 100b becomes small to the extent that light cannot be guided, while the influence of the light confinement by the second core 212 becomes dominant. This is because the MFD is reduced to a diameter based on the second core 212 under such a situation.

FIG. 10B illustrates a calculation result of a coupling loss (loss ( )) by an overlap integral of the field intensity distribution on the FIFO sample side and the field intensity distribution on the MCF 300 side in consideration of a leakage loss in order to confirm a decrease in loss of each prepared FIFO device. As can be seen from FIG. 10B, in the case of the FIFO sample according to Comparative Example 1, the amount of change of the overlap integral of the electric field intensity distribution of the FIFO sample and the MCF 300 also decreases as the amount of change of the MFD is suppressed. A final coupling loss is about 0.022 dB. In the case of the FIFO sample according to Comparative Example 2, since the MFD is enlarged in the tapered portion 120, the amount of change in the overlap integral of the electric field intensity distribution also increases. As a result, the final coupling loss is about 0.175 dB. In the case of the FIFO sample according to the present embodiment, since the amount of change of the MFD in the tapered portion 120 is large, the amount of change of the overlap integral of the electric field intensity distribution also temporarily increases. However, in the section from the tapered portion 120 toward the MCF-side end face 100b (second stationary portion 130), since the MFD is reduced to any diameter, the coupling loss (loss a) due to the overlap integral is also suppressed. The final coupling loss was about 0.007 dB, and a remarkable improvement as compared with Comparative Example 1 was confirmed.

It should be noted that, when the amount of change of the MFD (or the effective area $A_{eff}$) in the tapered portion 120 is large, there is a concern that the single mode cannot be maintained and the coupling loss is increased. Thus, in Comparative Example 1, in order to suppress the amount of change of the MFD, $r2_a/r1_a$ which is the ratio of the outer diameter $2r2_a$ of the second core 212 to the outer diameter $2r1_a$ of the first core 211 on the SCF-side end face 100a is set in a range of 3 or more and 5 or less.

On the other hand, in the case of the present embodiment, even when the amount of change in the MFD (or the effective area $A_{eff}$) in the tapered portion 120 is large, since the outer diameter ratio R is set to be smaller than a certain value (Condition 1), a core diameter at the center can be reduced and the MFD can be returned to any diameter. Thus, in the FIFO sample according to the present embodiment, the range of $r2_a/r1_a$ which is the outer diameter ratio of the first core 211 and the second core 212 is not substantially limited (the outer diameter ratio of the core is greater than 5). That is, according to the FIFO sample according to the present embodiment, since light can propagate through the tapered portion 120 while suppressing the leakage loss in a state where any control of the MFD can be performed, an insertion loss (connection loss) defined by the sum of the propagation loss and the coupling loss is effectively suppressed.

REFERENCE SIGNS LIST

100 FIFO device (optical connection device)
100a SCF-side end face (third end face)
100b MCF-side end face (fourth end face)
150A, 150B capillary
200 relay fiber
211 first core
212 second core
213 cladding
250 SCF (single-core fiber)
300 MCF (multi-core fiber)

What is claimed is:

1. An optical connection device that has a structure for enabling optical connection of a single-core fiber which is included in a multi-core fiber and has a mode filed diameter of 8.6 μm or more and 9.2 μm or less with each of a plurality of cores each having a mode field of 8.6 μm or more and 9.2 μm or less, the optical connection device comprising:
a plurality of relay fibers that are provided in one-to-one correspondence with the plurality of cores of the multi-core fiber, each have a first core having a first relative refractive index difference $\Delta 1(\%)$ with pure silica as a reference, a second core surrounding an outer periphery of the first core and having a second relative refractive index difference $\Delta 2(\%)$ lower than the first relative refractive index difference $\Delta 1(\%)$, and a cladding surrounding an outer periphery of the second core and having a third relative refractive index difference $\Delta 3(\%)$ lower than the second relative refractive index difference $\Delta 2$, and have a first end face and a second end face opposite to the first end face; and
a capillary that has a third end face from which the first end face protrudes, and a fourth end face on which the second end face is disposed, and integrally holds each of the plurality of relay fibers extending from the third end face toward the fourth end face, wherein
the capillary includes a tapered portion that is provided between the third end face and the fourth end face and has an outer diameter ratio R of 0.2 or less defined by a ratio of an outer diameter of the fourth end face to an outer diameter of the third end face, and
in each of the plurality of relay fibers,
a refractive index volume V1(% μm²) given by a product $((\pi \cdot r1_b^2) \times (\Delta 1 - \Delta 2))$ of a cross-sectional area of the fourth end face defined by a radius $r1_b$ (μm) of the first core and a difference $(\Delta 1 - \Delta 2)$ between the first and second relative refractive index differences and a refractive index volume V2(% μm²) given by a product $((\pi \cdot r2_b^2) \times (\Delta 2 - \Delta 3))$ of a cross-sectional area of the fourth end face defined by a radius $r2_b$ (μm) of the second core and a difference $(\Delta 2 - \Delta 3)$ between the second and third relative refractive index differences satisfy a following Formula:

$$156\% \mu m^2 \leq (V2-V1)/R \leq 177\% \mu m^2.$$

2. The optical connection device according to claim 1, wherein
in each of the plurality of relay fibers, the first core or the second core is comprised of pure silica.

3. The optical connection device according to claim 1, wherein
a ratio of the radius of the second core to the radius of the first core, which is defined on the third end face is greater than 5.0.

4. The optical connection device according to claim 1, wherein
the capillary includes
a first stationary portion that is provided between the third end face and the tapered portion in a state of including the third end face, a maximum outer diameter of a cross section intersecting a reference direction from the third end face toward the fourth end face in the first stationary portion being maintained at the same diameter from the third end face toward the fourth end face, and
a second stationary portion that is provided between the fourth end face and the tapered portion in a state of including the fourth end face, a minimum outer diameter of a cross section intersecting the reference direction in the second stationary portion being maintained at the same diameter from the third end face toward the fourth end face.

5. The optical connection device according to claim 4, wherein
when each length of the first stationary portion, the tapered portion, and the second stationary portion is defined along the reference direction, a ratio of the length of the first stationary portion to a sum of the length of the tapered portion and the length of the second stationary portion falls within a range of 0.5 or more and 30 or less.

* * * * *